United States Patent
Decker

(10) Patent No.: US 8,010,445 B1
(45) Date of Patent: Aug. 30, 2011

(54) CONSOLIDATED COMMERCIAL PAPER SYSTEM AND METHOD

(76) Inventor: Jerome L. Decker, Liberty Township, OH (US)

( * ) Notice: Subject to any disclaimer, the term of this patent is extended or adjusted under 35 U.S.C. 154(b) by 638 days.

(21) Appl. No.: 11/454,810

(22) Filed: Jun. 16, 2006

Related U.S. Application Data

(60) Provisional application No. 60/691,047, filed on Jun. 16, 2005.

(51) Int. Cl.
*G06Q 40/00* (2006.01)
(52) U.S. Cl. ......................................................... 705/38
(58) Field of Classification Search ...................... 705/38
See application file for complete search history.

(56) References Cited

U.S. PATENT DOCUMENTS

| | | | |
|---|---|---|---|
| 7,254,555 B2 * | 8/2007 | Field ............................ | 705/36 R |
| 7,313,541 B2 * | 12/2007 | Wise et al. ................... | 705/36 R |
| 7,359,875 B1 * | 4/2008 | Millette et al. ................ | 705/35 |
| 2002/0069160 A1 * | 6/2002 | Olin .............................. | 705/38 |
| 2002/0116325 A1 * | 8/2002 | Wise et al. ..................... | 705/38 |
| 2002/0133460 A1 * | 9/2002 | Field ............................. | 705/40 |
| 2003/0018563 A1 * | 1/2003 | Kilgour et al. ................ | 705/37 |
| 2006/0010057 A1 * | 1/2006 | Bradway et al. ............... | 705/35 |
| 2007/0203834 A1 * | 8/2007 | Field ............................. | 705/40 |

* cited by examiner

*Primary Examiner* — Lindsay M. Maguire
(74) *Attorney, Agent, or Firm* — David E. Pritchard

(57) ABSTRACT

One system for forming a consolidated commercial paper issue includes: a plurality of borrowers, with each borrower having a short-term borrowing need; a credit rating agency operable to determine a credit rating for each borrower; a consolidator operable to aggregate the short-term borrowing needs of at least two borrowers into a consolidated commercial paper issue; and a communication network operable to transmit communications between one or more of the credit rating agency, the consolidator, and at least one of the borrowers. One method of forming a consolidated commercial paper issue includes: identifying a plurality of borrowers, with each borrower having a short-term borrowing need; determining a credit rating for each borrower; and aggregating the short-term borrowing needs of at least two borrowers into a consolidated commercial paper issue.

28 Claims, 3 Drawing Sheets

CONSOLIDATED COMMERCIAL PAPER SYSTEM AND METHOD

CROSS-REFERENCE TO RELATED APPLICATION

This patent document claims the benefit of the filing date of Provisional Application No. 60/691,047, entitled "Consolidated Commercial Paper System and Method" and filed on Jun. 16, 2005. The entire disclosure of Provisional Application No. 60/691,047 is incorporated into this patent document by reference.

FIELD OF THE INVENTION

This invention relates to short term financing, and in particular, to commercial paper.

BACKGROUND OF THE INVENTION

Many businesses want or need to borrow funds on a relatively short term basis, in order to finance various aspects of their business activities. Large, highly creditworthy business with substantial short term borrowing needs typically can obtain financing for those needs through a debt instrument known as commercial paper. Commercial paper permits a borrowing business to obtain short term financing directly from an investor (i.e., a lender), which may be, for example, a banking institution, a mutual fund, an insurance company, a trust fund, a pension fund, or the like.

Investors, for example, individuals, trusts, and money managers, generally perceive commercial paper to be a very low risk investment for two reasons. First, investors require that the business issuing the commercial paper be very large and meet the highest standards of creditworthiness. Second, while the term of commercial paper may be up to 270 days, most commercial paper is issued for an average term of 45 days; and over such a short period, the risk of default of such large businesses can be relatively accurately evaluated. Thus, commercial paper has significant protection against a risk of loss of principal as well as interest, that is, investment income. The borrowing businesses prefer the issuance of commercial paper over other forms of short term borrowing because, generally, commercial paper rates are lower, that is, less expensive, than rates associated with other forms of short term borrowing, such as short term bank lines of credit.

Generally, commercial paper is issued only for substantial borrowing needs and is issued in larger increments, for example, $100,000, in order to defray the significant costs related to the issuing process. Commercial paper is sold either directly to investors, or through dealers who charge a commission fee for arranging the transaction. Thus, commercial paper is basically a business IOU, issued at a relatively low rate of interest for a short period of time. As noted above, investors, for example, individuals, trusts, and money managers, purchase the commercial paper either directly or through dealers. These investors (i.e., lenders) are willing to participate in the commercial paper market because the issuers are large and highly creditworthy, and thus the short term risk of default is minimal.

While commercial paper can be an excellent way to fund short term borrowing wants or needs, this form of financing often is not available. For example, if a business is not large and highly creditworthy, it will be unable to tap into the commercial paper market. And even a large, highly creditworthy company won't be able to raise funds via commercial paper if its short term borrowing need isn't sufficiently large.

In these situations, a business typically must rely on other short term borrowing options—options that are more expensive than commercial paper financing. Examples of such options including bank loans and bank lines of credit. The interest rates charged for bank loans usually are based on a government-determined interest rate (e.g., the federal funds rate), LIBOR or a similar rate, or the prime rate. And bank-loan interest rates generally make the cost of bank-loan borrowing higher than that for commercial-paper borrowing. In the case of bank lines of credit, banks generally require a compensating balance—which in essence makes the cost of borrowing higher, or reduces the net amount of short term funds available, to a business that borrows via this option.

While commercial paper is an excellent debt instrument for large and highly creditworthy businesses to use in order to finance short term needs, a commercial paper market does not exist for smaller and less creditworthy businesses because of the increased risk perceived by investors. A commercial paper market also does not exist for borrowers with smaller needs because of the cost of issuance. Therefore, there is a need to provide a broader commercial paper market.

SUMMARY OF THE INVENTION

The present invention provides consolidated commercial paper that expands the commercial paper market. The consolidated commercial paper of the present invention is especially useful to businesses that are smaller and less creditworthy than known businesses that currently participate in the commercial paper market. The consolidated commercial paper of the invention also is useful for businesses that are sufficiently large and creditworthy to participate in the conventional commercial paper market, but whose short term borrowing needs at a given point in time are too small for the conventional market.

These and other objects and advantages of the present invention will become more readily apparent from the following detailed description taken in conjunction with the drawings herein.

BRIEF DESCRIPTION OF THE DRAWINGS

The accompanying drawings, which are incorporated herein and constitute a part of this specification, illustrate embodiments of the invention and, together with the general description of the invention given above, and the detailed description of the drawings given below, serve to explain the principles of the invention. Even though the drawings depict different embodiments of the invention described and claimed herein, elements that are commonly numbered in the drawings are substantially similar.

DETAILED DESCRIPTION OF THE DRAWINGS

Figure 1:
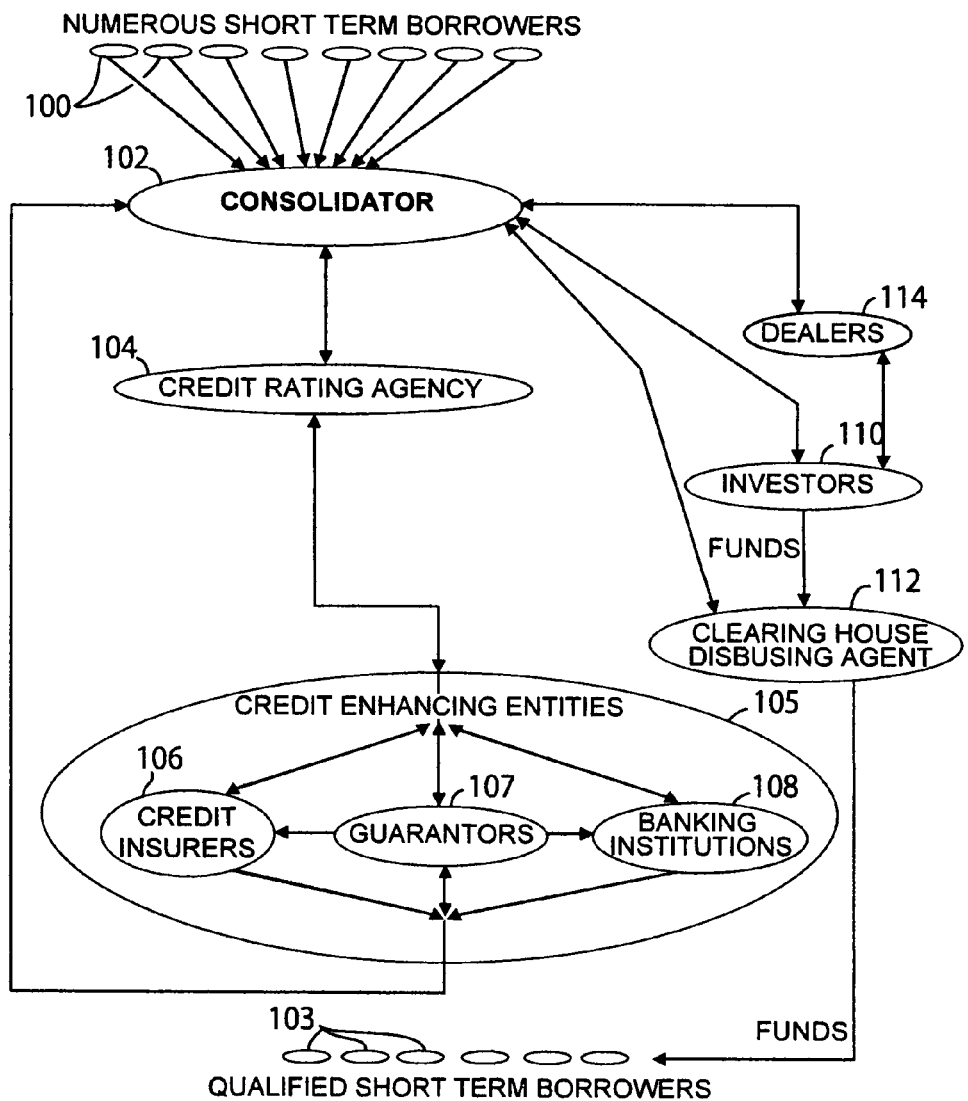
FIG. 1 is a diagram illustrating actors who may participate in a process of creating consolidated commercial paper, in accordance with the principles of the present invention.
Figure 2:
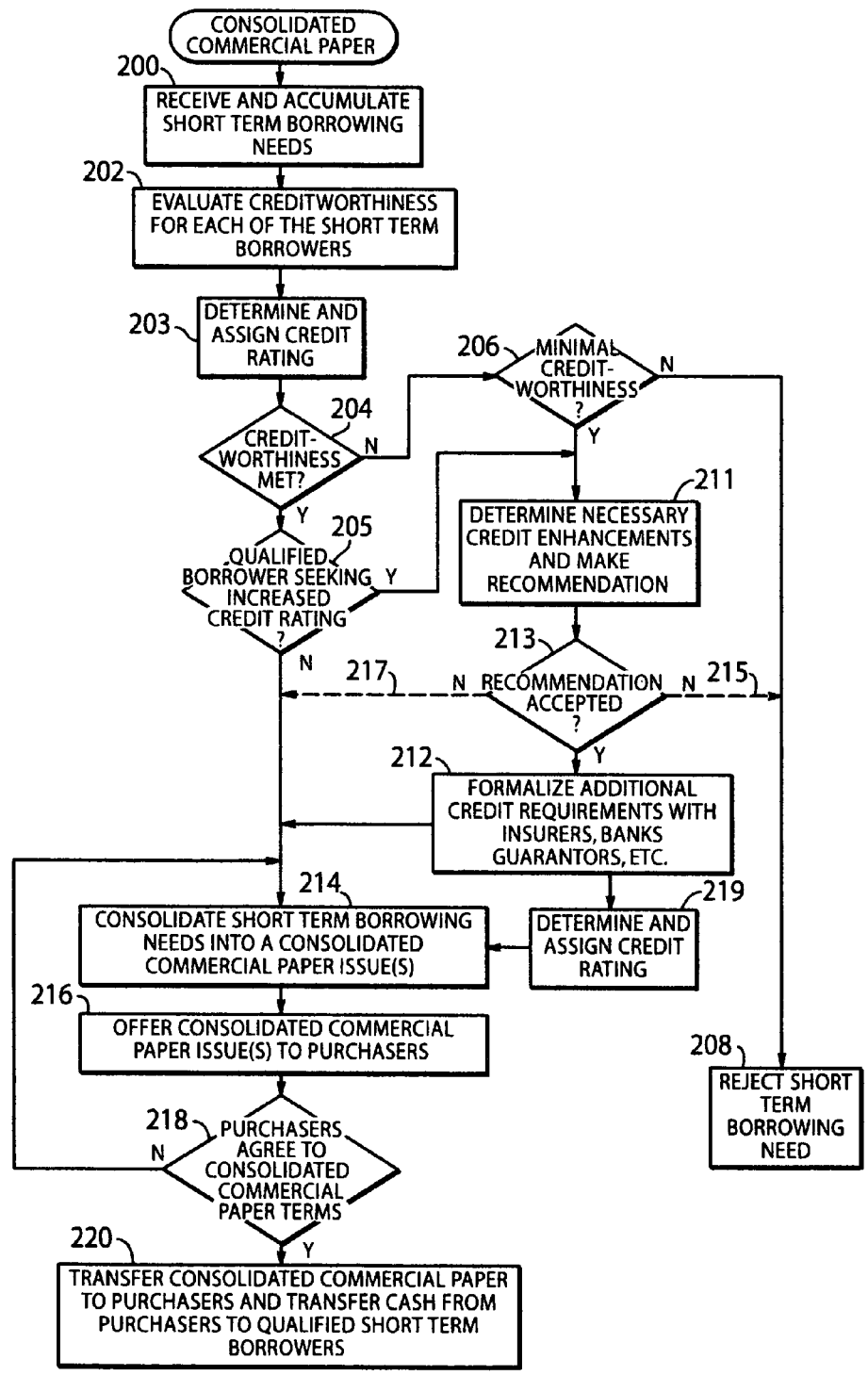
FIG. 2 is a flow chart illustrating an exemplary process of creating consolidated commercial paper, in accordance with the principles of the present invention.

Referring to FIGS. 1 and 2, there are numerous short term borrowers 100 whose size and/or creditworthiness, or whose size of borrowing need, does not permit them to finance their short term borrowing needs with commercial paper. As shown at 200 in FIG. 2, an initial step in creating consolidated commercial paper is for the numerous short term borrowing needs to be received and accumulated. In practice, a consolidator 102 receives loan applications from the numerous short term borrowers 100. One of the roles of the consolidator 102 is to consolidate qualified short term borrowing needs into consolidated commercial paper issues that have a creditworthiness sufficient to participate in known commercial paper markets. For the short term borrowers 100, such consolidated commercial paper is more cost-effective than known short term financing options. At the same time, the consolidated commercial paper does not present an increased risk to investors who participate in known commercial paper markets. Typically, the consolidator 102 has in mind a particular rating for the consolidated commercial paper that it wants to issue. For example, the consolidator 102 may know that it wants to have one offering of consolidated commercial paper having a P-1/A-1 rating, and a separate offering in which the consolidated commercial paper has a P-2/A-2 rating.

The next step, at 202, is to evaluate the creditworthiness of each borrower 100 having a short term borrowing need. Practically, this may be accomplished by the consolidator 102 performing a preliminary screening of the loan applications and rejecting those that do not merit a further examination. The consolidator 102 then may forward the remaining short term borrower loan applications to a credit rating agency 104. Also, the consolidator 102 may let the agency 104 know the rating of at least the lowest-rated consolidated commercial paper that the consolidator 102 wants to issue. In this fashion, the agency 104 is made aware of the minimum creditworthiness rating that a given borrower 100 ultimately will need to have, in order to participate in a particular consolidated commercial paper issue. The credit rating agency 104 then, at 203, may determine a credit rating for each borrower 100 associated with a loan application that has been forwarded from the consolidator 102 to the agency 104. This determination of credit ratings may be done in a manner consistent with the rating systems used in the known commercial paper market. In the next step, at 204, a determination may be made as to whether a borrower 100 has a creditworthiness sufficient to allow it to participate in a particular consolidated commercial paper issue (e.g., a credit rating that meets or exceeds an eligibility credit rating). If desired, this determination may be accomplished by comparing the borrower's credit rating (established at 203) with the rating of the particular consolidated commercial paper that the consolidator 102 wants to issue. If, for example, the borrower's credit rating meets or exceeds the rating of the consolidated commercial paper that the consolidator 102 wants to issue, then the borrower 100 may be deemed to have a sufficient creditworthiness.

If a borrower 100 has a credit rating sufficient to permit it to participate in a particular consolidated commercial paper issue, then the borrower 100 may be designated a qualified short term borrower 103. For example, a large and creditworthy business may have a short term borrowing need that is too small to provide a traditional commercial paper issue. In that situation, additional creditworthiness would not be required for that creditworthy business to participate in a particular consolidated commercial paper issue. In the next step, at 205, a determination may be made as to whether the qualified borrower 103 wants to enhance its creditworthiness—with the enhancement likely resulting in a stronger credit rating. If the qualified borrower 103 does not seek a higher rating, then its borrowing need may be consolidated with other borrowing needs at 214, as discussed in further detail below. On the other hand, if the qualified borrower 103 wants to pursue a higher creditworthiness rating, then it may be given the opportunity to do so, as discussed in detail below.

If, at step 204, it is determined that a short term borrower 100 is not sufficiently creditworthy to participate in a particular issue (e.g., the particular borrower's credit rating does not meet or exceed an eligibility credit rating), the credit rating agency 104 then may determine, at 206, whether the borrower 100 has a minimum required creditworthiness (i.e., a threshold credit rating) to qualify to utilize one or more credit enhancing entities 105. (The entities 105 are described in greater detail below.) If the borrower 100 does not have the minimal creditworthiness required to qualify for use of a credit enhancing entity 105, then at 208, the short term borrowing need may be rejected and the borrower 100 may be so advised. On the other hand, if, at 206, it is determined that the borrower 100 does have a minimum creditworthiness sufficient to qualify to utilize one or more credit enhancing entities 105, the credit rating agency 104 then, at 211, may determine the credit enhancement(s) necessary in order for the borrower 100 to establish a creditworthiness rating sufficient to become a qualified short term borrower 103 for a particular consolidated commercial paper issue (e.g., a credit rating that meets or exceeds an eligibility credit rating). In addition, at 211, the agency 104 may present the enhancement(s) to the consolidator 102 and/or the particular borrower 100, in the form of one or more credit enhancement recommendations. Then the borrower 100, at 213, has the opportunity to accept or reject a recommendation. If, as shown by the dashed line 215, the borrower 100 rejects the recommendation(s) of the credit rating agency 104, then, at 208, the short term borrowing need may be rejected. If the borrower 100 accepts a recommendation of the credit rating agency 104, then, at 212, the credit enhancement(s) may be formalized with the relevant credit enhancing entity or entities 105. Then, at 219, the credit rating agency 104 may determine an updated creditworthiness rating for the borrower 100, consistent with the ratings used in the known commercial paper market; and the borrower 100 now may be designated a qualified short term borrower 103. As shown at 214 and discussed in detail below, this qualified borrower's short term borrowing need then may be consolidated with other borrowing needs, to form one or more consolidated commercial paper issues.

If, at 205, a qualified short term borrower 103 (i.e., one that already is qualified to participate in a particular consolidated commercial paper issue) wants to enhance its creditworthiness (e.g., to increase its credit rating from P2 to P1), and if the consolidator 102 chooses to permit the borrower 103 to go through a credit enhancement analysis, then, at 211, the credit rating agency 104 may determine the credit enhancement(s) necessary for the borrower 103 to attain an enhanced credit rating. The credit rating agency 104 then may form one or more credit enhancement recommendations, and may communicate them to the consolidator 102 and/or the particular borrower 103. Then, at 213, the borrower 103 has the opportunity to accept or reject a recommendation. If a recommendation is accepted, then, at 212, the recommendation may be formalized via agreement(s) between the borrower 103 and the appropriate credit enhancing entity or entities 105. And, at 219, the credit rating agency 104 may determine an updated creditworthiness rating for the borrower 103, consistent with the ratings used in the known commercial paper market. Then, at 214 as discussed in detail below, the borrower's short term need may be consolidated with other borrowing needs, taking into account the borrower's updated credit rating. If, on the other hand, the borrower 103 rejects the recommendation(s) of the credit rating agency 104, then, as shown by the dashed line 217, the short term borrowing need still may be consolidated, at 214, with other borrowing needs, but based on the borrower's previously-determined credit rating. For example, the borrowing need may be consolidated into a commercial paper issue having a somewhat lower creditworthiness rating.

In order for a short term borrower 100 to attain a sufficient creditworthiness rating (e.g., a rating that meets or exceeds an eligibility credit rating), or for a qualified short term borrower 103 to arrive at a higher creditworthiness rating, the credit rating agency 104 may contact one or more credit enhancing entities 105, for example, credit insurers 106, guarantors 107, banking institutions 108, and/or any other entity that can increase the creditworthiness of the borrower 100, 103. In this process, the credit rating agency 104 may work with one or more of the credit enhancing entities 105 to develop one or more credit enhancement recommendations for the borrower 100, 103. The recommendation(s) may include amounts and terms for one or more credit enhancing vehicles, for example, credit insurance, line(s) of credit, and/or credit guarantees that would raise the creditworthiness of the borrower 100, 103 in the consolidated commercial paper market. Alternatively, the borrower 100, 103 may contact, and communicate with, one or more of the credit enhancing entities 105 directly.

At this point, the consolidator 102, at 214, may consolidate (i.e., aggregate) the identified short term borrowing needs into one or more consolidated commercial paper issues. If desired, a consolidated issue may include a total value, a term (e.g., 1-270 days), a minimum purchase increment, and/or an interest rate or discount. The short term borrowing needs can be grouped into different issues in ways that promote their marketability. For example, the short term borrowing needs can be grouped into different consolidated commercial paper issues as a function of the borrowers' respective creditworthiness ratings. In this example, those short term borrowing needs of borrowers 103 having the highest creditworthiness rating may be grouped into a consolidated commercial paper issue that bears a lower interest rate or discount. Similarly, the short term borrowing needs of borrowers 103 having the lowest creditworthiness rating may be grouped into a consolidated commercial paper issue that bears a higher interest rate or discount. In another example, the short term borrowing needs that are backed by a particularly reputable credit insurance underwriter may be grouped into a single consolidated commercial paper issue. Thus, how a consolidator 102 decides to package short term borrowing needs into a consolidated commercial paper issue may depend on market conditions at the time the issue is created.

The qualified short term borrowers 103 included in a consolidated commercial paper issue may or may not be identified. Some short term borrowers 103 may believe that their participation in the commercial paper market increases their ability to obtain equity or other financing, or other favorable business related arrangements, and thus, may desire that their identity be disclosed. Others may desire anonymity.

Thereafter, at 216, the consolidator 102 may make one or more consolidated commercial paper issues available to the commercial paper market for purchase by one or more investors 110, either directly or through one or more dealers 114. The investor(s) 110 and dealer(s) 114 may make their purchase decisions based on creditworthiness ratings and other information relating to a consolidated commercial paper issue; but typically, these purchasers will not require the identity of the short term borrowers 103 because of the credit rating agency evaluations, credit enhancements, and/or diversification provided by having many borrowers 103 in the consolidated commercial paper issue. After an analysis of the financial terms of a consolidated commercial paper issue by the dealer(s) 114 and/or investor(s) 110, these purchasers may, at 218, agree to purchase some quantity of the consolidated commercial paper issue.

Thereafter, at 220, the consolidator 102 may transfer, in electrical or hardcopy form, the consolidated commercial paper purchased by the dealer(s) 114 and/or investor(s) 110; and in exchange therefore, the dealer(s) 114 and/or investor (s) 110 may transfer funds to the consolidator 102. The consolidator 102 then may distribute at least a portion of the funds to the short term borrowers 103. In another example, the transfer of funds from the investor(s) 110 and/or dealer(s) 114 to the consolidator 102 and/or borrowers 103 can be conducted by a third party clearinghouse or disbursing agent 112, as instructed by the consolidator 102.

Figure 3:
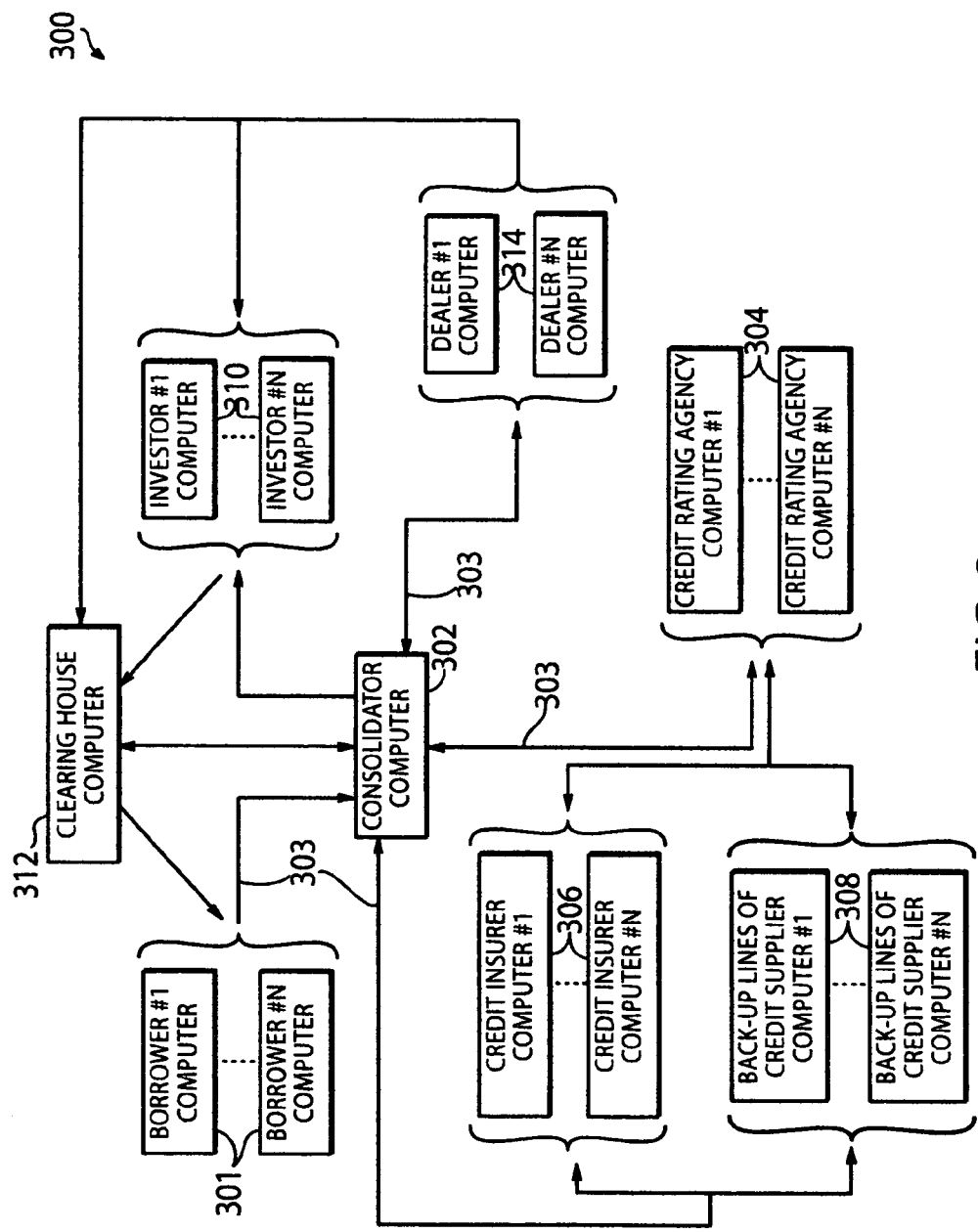
FIG. 3 is a schematic block diagram of an exemplary system for implementing the process of creating consolidated commercial paper illustrated in FIG. 2.

The consolidated commercial paper process of FIG. 2 can be practiced utilizing known technologies and systems. For example, as shown in FIG. 3, a consolidated commercial paper system 300 can be implemented using computers of the various actors that are connected by communication links 303 (e.g., telephone lines, cable lines, and/or the Internet) that can be wired and/or wireless. Alternatively, any of the communication links 300 may be implemented using non-electrical means such as postal mail and/or courier.

In the example of FIG. 3, borrower computers 301 may be electrically linked to a consolidator computer 302 to provide loan applications in a electrical format. The consolidator computer 302 may be electrically linked to one or more credit rating agency computers 304 that may be programmed to perform an evaluation to rate the creditworthiness of the short term borrowers' loan applications. Short term borrowers' loan applications that do not meet a minimal creditworthiness (e.g., a threshold credit rating) may be rejected by the credit rating agency computer(s) 304, and that fact may be communicated to the appropriate borrower computer(s) 301 via the consolidator computer 302. Further, if one or more borrowers are deemed to require some credit enhancement, the credit rating agency computer(s) 304 can be placed in electrical communication with one or more credit insurance entity computers 306, credit guarantor entity computers (not shown), and computers 308 of suppliers of backup lines of credit. Thus, a package or recommendation for credit enhancement can be determined and communicated back to the appropriate short term borrower computer(s) 301 via the consolidator computer 302.

Upon an acceptance of those credit enhancement recommendations being communicated from the short term borrower computer(s) 301 to the credit rating agency computer (s) 304 via the consolidator computer 302, specific arrangements for credit insurance and/or one or more backup lines of credit may be formalized via the credit insurer computer(s) 306 and the backup lines of credit supplier computer (s) 308. The consolidator 102 can then use the consolidator computer 302 to form the short term borrowing needs into one or more consolidated commercial paper issues and offer the issue(s) on the commercial paper market. The issue(s) can be analyzed and purchased by dealers 114 and investors 110 using their respective computers 314, 310. Upon dealers 114 and investors 110 deciding to purchase respective increments of a particular consolidated commercial paper issue, their respective computers 314 and 310 can be connected to the consolidator computer 302 to effect an exchange of funds for the purchased consolidated commercial paper. Further, the consolidator computer 302 can be connected to the short term borrower computers 301 to distribute the funds to the short term borrowers 103. Also, a clearinghouse computer 312 may be placed in electrical communication with the dealer computer(s) 314, the investor computer(s) 310, the consolidator computer 302, and the borrower computers 301 to effect a transfer of funds from the dealer(s) 114 and/or investor(s) 110 to the short term borrowers 103 under instructions from the consolidator 102.

The consolidated commercial paper described and claimed herein provides a new short term financing opportunity for businesses that are not able to participate in the known commercial paper market. The consolidated commercial paper has an advantage of making short term financing available to such businesses at rates that are less than conventional short term loans and lines of credit traditionally available through banking institutions. Further, the consolidated commercial paper has a credit worthiness rating that provides a market for dealers and investors that purchase known commercial paper.

While the invention has been illustrated by the description of embodiments, and while the embodiments have been described in considerable detail, there is no intention to restrict nor in any way limit the scope of the appended claims to such detail. Additional advantages and modifications will readily appear to those who are skilled in the art. For example, in the exemplary embodiment shown and described in FIG. 1, the consolidator 102 is functionally illustrated as an independent actor. However, in alternative embodiments, the function of the consolidator can be integrated into a credit rating agency 104, a credit insurer 106, a guarantor 107, a banking institution 108, a dealer 114, a very large borrower, or another entity that can reliably accumulate, qualify, and consolidate short term borrowing needs into a consolidated commercial paper instrument as described herein. In addition, although the embodiments described above have presented the borrowers as businesses, the consolidated commercial paper invention encompasses any other suitable types of borrowers, as well (e.g., municipal issuers and sovereign issuers).

Therefore, the invention in its broadest aspects is not limited to the specific details shown and described. Consequently, departures may be made from the details described herein without departing from the spirit and scope of the claims which follow.

What is claimed is:

1. A method of forming a non-asset-backed consolidated commercial paper issue, comprising the steps of:
    identifying a plurality of borrower businesses, each of the plurality of borrower businesses having a short-term borrowing need, the short term borrowing need including a desire to borrow funds on a short-term basis for subsequent repayment;
    determining a credit rating for each of the plurality of borrower businesses;
    aggregating with a computer the short-term borrowing needs of at least two of the plurality of borrower businesses into a non-asset-backed consolidated commercial paper issue based at least in part on the credit rating of each of the at least two borrower businesses;
    offering at least a portion of the non-asset-backed consolidated commercial paper issue to at least one purchaser;
    selling at least a portion of the non-asset-backed consolidated commercial paper issue to the at least one purchaser;
    receiving funds in exchange for the non-asset-backed consolidated commercial paper issue sold to the at least one purchaser; and
    distributing at least a portion of the funds to the borrower businesses whose short-term borrowing needs were aggregated into the non-asset-backed consolidated commercial paper issue.

2. The method of claim 1 wherein the identifying step includes receiving a loan application from each of the plurality of borrower businesses.

3. The method of claim 1 further including the step of performing a preliminary screening of each of the plurality of borrower businesses.

4. The method of claim 1 further including the step of accumulating the short term borrowing needs of at least two of the plurality of borrower businesses for possible aggregation into the non-asset-backed consolidated commercial paper issue.

5. The method of claim 1 further including the step of determining a credit rating for the non-asset-backed consolidated commercial paper issue.

6. The method of claim 5 wherein at least one borrower business whose short term borrowing need is aggregated into the non-asset-backed consolidated commercial paper issue has a credit rating different from that of another borrower business whose short term borrowing need is aggregated into the non-asset-backed consolidated commercial paper issue.

7. The method of claim 1 wherein the credit rating of each of the borrower businesses whose short-term borrowing need is aggregated into the non-asset-backed consolidated commercial paper issue is the same.

8. The method of claim 1 further including the step of comparing the credit rating of each of the plurality of borrower businesses to an eligibility credit rating, the short-term borrowing need of a given one of the plurality of borrower businesses qualifying to be aggregated if the credit rating of the given borrower business meets or exceeds the eligibility credit rating.

9. The method of claim 8 wherein the credit rating of the given borrower business meets or exceeds the eligibility credit rating, and the short-term borrowing need of the given borrower business is aggregated into the non-asset-backed consolidated commercial paper issue.

10. The method of claim 8 wherein the credit rating of the given borrower business meets or exceeds the eligibility credit rating, the method further including the step of forming a credit-enhancement recommendation for the given borrower business, which if adopted, will increase the credit rating of the given borrower business.

11. The method of claim 10 wherein the given borrower business adopts the credit-enhancement recommendation.

12. The method of claim 11 wherein the short-term borrowing need of the given borrower business is aggregated into a different non-asset-backed consolidated commercial paper issue, the non-asset-backed consolidated commercial paper issue and the different non-asset-backed consolidated commercial paper issue each having a credit rating, the credit rating of the different non-asset-backed consolidated commercial paper issue being higher than the credit rating of the non-asset-backed consolidated commercial paper issue.

13. The method of claim 8 wherein the credit rating of the given borrower business is lower than the eligibility credit rating but higher than a threshold credit rating, the method further including the step of forming a credit-enhancement recommendation for the given borrower business, which if adopted, will increase the credit rating of the given borrower business to a level that meets or exceeds the eligibility credit rating.

14. The method of claim 13 wherein the given borrower business adopts the credit-enhancement recommendation, and the short-term borrowing need of the given borrower business is aggregated into the non-asset-backed consolidated commercial paper issue.

15. The method of claim 1 wherein the non-asset-backed consolidated commercial paper issue has a term, the method further including the step of the borrower businesses whose short-term borrowing needs were aggregated into the non-asset-backed consolidated commercial paper issue repaying at least a portion of the funds to the at least one purchaser at the end of the term.

16. The method of claim 1 wherein the at least one purchaser includes one or more of an investor and a dealer.

17. The method of claim 1 wherein, in the receiving funds step, the funds are received from one or more of an investor, a dealer, and a clearing house.

18. A system for forming a non-asset-backed consolidated commercial paper issue, comprising:
 a plurality of borrower businesses, each borrower business having a short-term borrowing need;
 a credit rating agency, the credit rating agency operable to determine a credit rating for each borrower business;
 a consolidator business, the consolidator business operable to aggregate the short-term borrowing needs of at least two borrower businesses into a non-asset-backed consolidated commercial paper issue;
 at least one purchaser, the purchaser operable to purchase at least a portion of the non-asset-backed consolidated commercial paper issue in exchange for funds;
 the consolidator business operable to offer at least a portion of the non-asset-backed consolidated commercial paper issue, to sell at least at least a portion of the non-asset-backed consolidated commercial paper issue, and to receive funds in exchange for the portion of the non-asset-backed consolidated commercial paper issue purchased;
 the consolidator business operable to distribute at least some of the funds to borrower businesses corresponding to respective short term borrowing needs; and
 a communication network, the communication network configured to transmit communications between one or more of the credit rating agency, the consolidator business, at least one of the borrower businesses, and the at least one purchaser.

19. The system of claim 18 wherein the communication network includes one or more of a postal mail network, a telephone network, a facsimile network, a computer network, an internet, and a world wide web.

20. The system of claim 18 wherein at least one of the borrower businesses includes a borrower business computer, and the consolidator business includes a consolidator business computer operable to communicate electrically with the borrower business computer.

21. The system of claim 18 wherein the credit rating agency includes a credit rating agency computer, and the consolidator business includes a consolidator business computer operable to communicate electrically with the credit rating agency computer.

22. The system of claim 18 further comprising a credit enhancement entity, the credit enhancement entity including a credit enhancement entity computer operable to communicate electrically with one or more of a borrower business computer, a consolidator business computer, and a credit rating agency computer.

23. The system of claim 18 wherein the purchaser includes a purchaser computer operable to communicate electrically with one or more of a borrower business computer, a consolidator business computer, and a credit rating agency computer.

24. The system of claim 18 wherein the at least one purchaser includes one or more of an investor and a dealer.

25. The system of claim 18 further comprising a clearing house, the clearing house operable to transfer funds from a purchaser to one or more of the consolidator business and at least one of the at least two borrower businesses.

26. A system for forming a non-asset-backed consolidated commercial paper issue, comprising:
 a plurality of borrower businesses' computers configured to create a plurality of short term borrowing needs from a plurality of borrower businesses;
 a consolidator business computer in electrical communication with the plurality of borrower businesses' computers and configured to receive the plurality of short term borrowing needs;
 a credit rating agency computer in electrical communication with the consolidator business computer and configured to provide to the consolidator business computer credit ratings for respective ones of the plurality of borrower businesses;
 the consolidator business computer configured to aggregate in response to the credit ratings, selected ones of the plurality of short term borrowing needs into a non-asset-backed consolidated commercial paper issue;
 a plurality of purchaser computers in electrical communication with the consolidator business computer and configured to purchase at least a portion of the non-asset-backed consolidated commercial paper issue in exchange for funds;
 the consolidator business computer configured to offer at least a portion of the non-asset-backed consolidated commercial paper issue, to sell at least at least a portion of the non-asset-backed consolidated commercial paper issue, and to receive funds in exchange for the portion of the non-asset-backed consolidated commercial paper issue purchased; and
 the consolidator business computer configured with the plurality of borrower businesses' computers to distribute at least some of the funds to borrower businesses corresponding to respective short term borrowing needs.

27. The system of claim 26 wherein the at least one purchaser computer includes one or more of an investor computer and a dealer computer.

28. The system of claim 26 further comprising a clearing house computer in electrical communication with one or more of a borrower business computer, a consolidator business computer, and a purchaser computer, the clearing house computer configured to transfer funds from a purchaser computer to one or more of the consolidator business computer and the borrower business computer.

* * * * *